(12) United States Patent
Theis (10) Patent No.: US 6,233,791 B1
(45) Date of Patent: May 22, 2001

(54) CABLE MANAGEMENT SYSTEM

(75) Inventor: John W. Theis, Cottage Grove, MN (US)

(73) Assignee: Ergotron, Inc., Eagan, MN (US)

( * ) Notice: Subject to any disclaimer, the term of this patent is extended or adjusted under 35 U.S.C. 154(b) by 0 days.

(21) Appl. No.: 09/225,785

(22) Filed: Jan. 5, 1999

(51) Int. Cl.[7] .......................... A44B 21/00; B65D 63/00; F16G 11/06
(52) U.S. Cl. .................... 24/135 R; 24/20 R; 24/136 R; 24/284
(58) Field of Search .............................. 24/135 R, 135 N, 24/136 R, 326, 336, 278, 284, 16 R (56) References Cited

U.S. PATENT DOCUMENTS

| | | | |
|---|---|---|---|
| 2,220,203 | * 11/1940 | Branin | 24/136 R |
| 2,578,008 | * 12/1951 | Judd | 24/135 R |
| 2,917,799 | * 12/1959 | Meighan | 24/136 R |
| 3,051,952 | * 8/1962 | Pifer | 24/20 R |
| 3,147,754 | * 9/1964 | Koessler | 128/346 |
| 3,258,822 | * 7/1966 | Schlesch et al. | 24/284 |
| 3,721,750 | * 3/1973 | Countryman | 24/16 R |
| 4,175,728 | * 11/1979 | Ferguson | 24/16 R |
| 4,244,083 | * 1/1981 | Aremka et al. | 24/16 R |
| 4,741,669 | * 5/1988 | Shimokawabe | 24/615 |
| 4,974,549 | * 12/1990 | Gordon | 24/135 R |

* cited by examiner

*Primary Examiner*—Victor N. Sakran
(74) *Attorney, Agent, or Firm*—Schwegman, Lundberg, Woessner & Kluth, P.A.

(57) ABSTRACT

Cable management system for securing cables to static or variable geometry host surfaces. The cable management system is in the form of a resilient U-shaped clip having, at its ends, outwardly open channels which forcefully engage slots in the body of a host object to form a capture area between the U-shaped clip and the surface of the host object. Positional security of the cable management system is provided by an anchoring tab extending inwardly from the interior region of the U-shaped clip through which a fastener is extended to engage a hole in the host object.

18 Claims, 7 Drawing Sheets

和 along the surface of a host surface of static and/or variable geometry.

CABLE MANAGEMENT SYSTEM

CROSS REFERENCE TO CO-PENDING APPLICATIONS

NONE.

BACKGROUND OF THE INVENTION

1. Field of the Invention

The present invention pertains to a system for securing cables, and more particularly relates to a cable management system utilizing a resilient U-shaped member readily and easily secured by channels and an anchoring tab to one or more host surfaces to capture and manage cables along and beyond such surfaces where the cables are subject to bending, twisting, flexing, stretching and the like due to positioning of members auxiliary to the surfaces.

2. Description of the Prior Art

Prior art devices for managing cables often provided for cable clips which engaged a host member utilizing snap fit members. These devices may have proved satisfactory for static routing and fixation of cables to a static or still object or surface, but when host surfaces or adjacent auxiliary members were of the moveable variety whereby flexing, repositioning or other movement occurred, tensions along a likewise repositioned cable created objectionable side or cross loads causing the clip to disengage from the host surface, thus allowing the cable to be released from influence of the clip and thereby causing undesirable cable routing, positioning or stress. Clearly what is needed is a device which routes and manages cables placed in positions of static and/or variable geometry which is easily installed and which provides for positive securement of itself and of a cable to a host body.

SUMMARY OF THE INVENTION

The present invention pertains to a cable clip, and, more particularly, pertains to a cable management system which can be used to anchor or secure cables or wires to host devices having fixed and/or variable geometry such as, for example, but not limited to, a support arm for supporting a viewing screen. The cable management system comprises a one-piece U-shaped device having flanges and channels at each opposing extremity of the U-shape for initial securement of the U-shaped device to slots in a host object, and an inwardly facing anchoring tab for final securement of the U-shaped device to the host object. The body of the U-shaped device is offset from its extremities to allow ready unobstructed access to the inwardly facing anchoring tab for insertion of a fastening screw through a hole residing in the inwardly facing anchoring tab.

According to one embodiment of the present invention there is provided a U-shaped member extending at an offset between interrupted planar surfaces at the extremities of the U-shaped member, flanges extending upwardly and outwardly from the interrupted planar surfaces at the extremities of the U-shaped member, channels formed between components of the flanges and the interrupted planar surfaces at the extremities of the U-shaped member, and an anchoring tab extending inwardly and directed partially across the upper region of the U-shaped member from near the junction of the U-shaped member and one flange and channel.

One significant aspect and feature of the present invention is a cable management system which readily secures to a host surface for management of cables, wires and the like to and along the surface of a host surface of static and/or variable geometry.

Another significant aspect and feature of the present invention is a cable management system which is U-shaped and which utilizes the resilient memory and spring quality across the U-shaped cable management system to forcefully engage slots in a host member.

Another significant aspect and feature of the present invention is a cable management system which snappingly engages corresponding slots in a host member and which includes an anchoring tab for additional and positive fixation of the cable management system to the host member.

Another significant aspect and feature of the present invention is a cable management system which is U-shaped and has connective and opposing channels at the extremities thereof for capture within the slots of a host member.

Another significant aspect and feature of the present invention is a cable management system having a U-shaped body which is angularly offset from the connective channels to provide for access to an orifice in the anchoring tab.

Another significant aspect and feature of the present invention is a cable management system which has a flange having an extended horizontal portion which urges one extremity of the U-shaped cable management system to remain in a host slot during installation of the cable management system to a host surface.

Having thus described one embodiment of the present invention it is the principal object hereof to provide a cable management system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
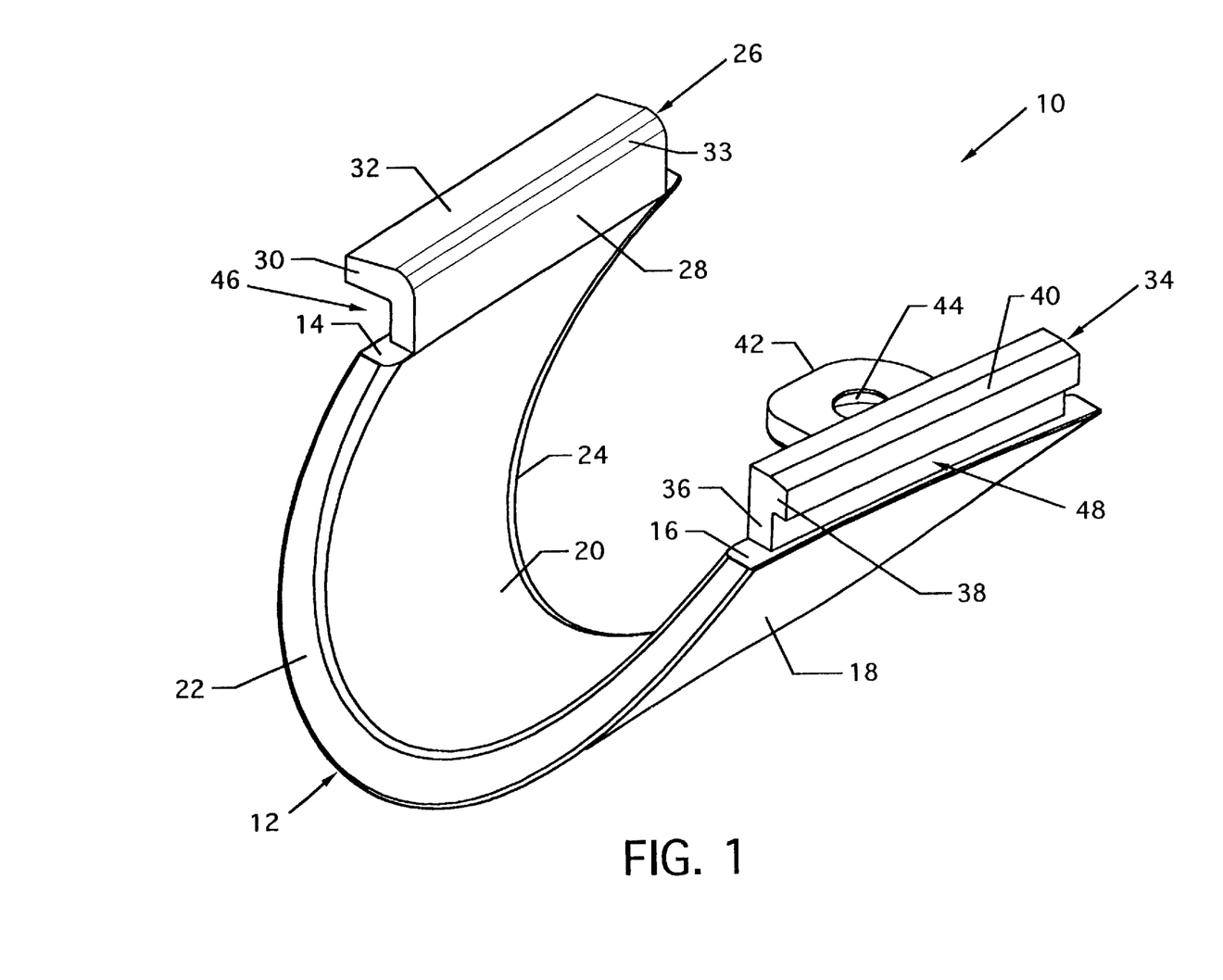
FIG. 1 illustrates an isometric view of a cable management system, the present invention.

FIG. 1 illustrates an isometric view of a cable management system 10, the present invention, such as for supporting and managing cables. The cable management system 10 comprises a resilient one-piece plastic device substantially in the shape of a U and having, amongst other members, a continuous U-shaped body 12 which terminates as an interrupted planar surface 14 at one extremity and as another interrupted planar surface 16 at an opposing extremity. Extending along and about the U-shaped body 12 and between the interrupted planar surfaces 14 and 16 are an exterior curved surface 18, an interior curved surface 20, an edge surface 22 being also common to the exterior curved surface 18 and the interior curved surface 20, and an edge surface 24 being also common to the exterior curved surface 18 and the interior curved surface 20. An upwardly and outwardly directed flange 26 extends from the interrupted planar surface 14 and includes a vertically oriented portion 28 extending upwardly and vertically from the interrupted planar surface 14 and a horizontally oriented portion 30 extending substantially at a right angle and outwardly from the upper region of the vertically oriented portion 28. The horizontally oriented portion 30 includes an angled surface 32 along its upper region. A radiused surface 33 extends along the junction of the vertical portion 28 and the horizontal portion 30 of the flange 26 and in juxtaposition to the angled surface 32 to allow for ready and unhampered accommodation of the flange 26 by a host object. In a somewhat similar manner and with the exclusion of a radiused surface, an upwardly and outwardly directed flange 34 opposes flange 26 and extends from the interrupted planar surface 16 and includes a vertically oriented portion 36 extending upwardly and vertically from the interrupted planar surface 16 and a horizontally oriented portion 38 extending substantially at a right angle and outwardly from the upper region of the vertically oriented portion 36. The horizontally oriented portion 38 includes an angled surface 40 along its upper region. An anchoring tab 42 having a body hole 44 for receipt of a screw or bolt is located in close proximity to the flange 34 and extends inwardly from the interior curved surface 20 and substantially at a right angle with respect to the vertical portion 36 of the flange 34.

Figure 2:
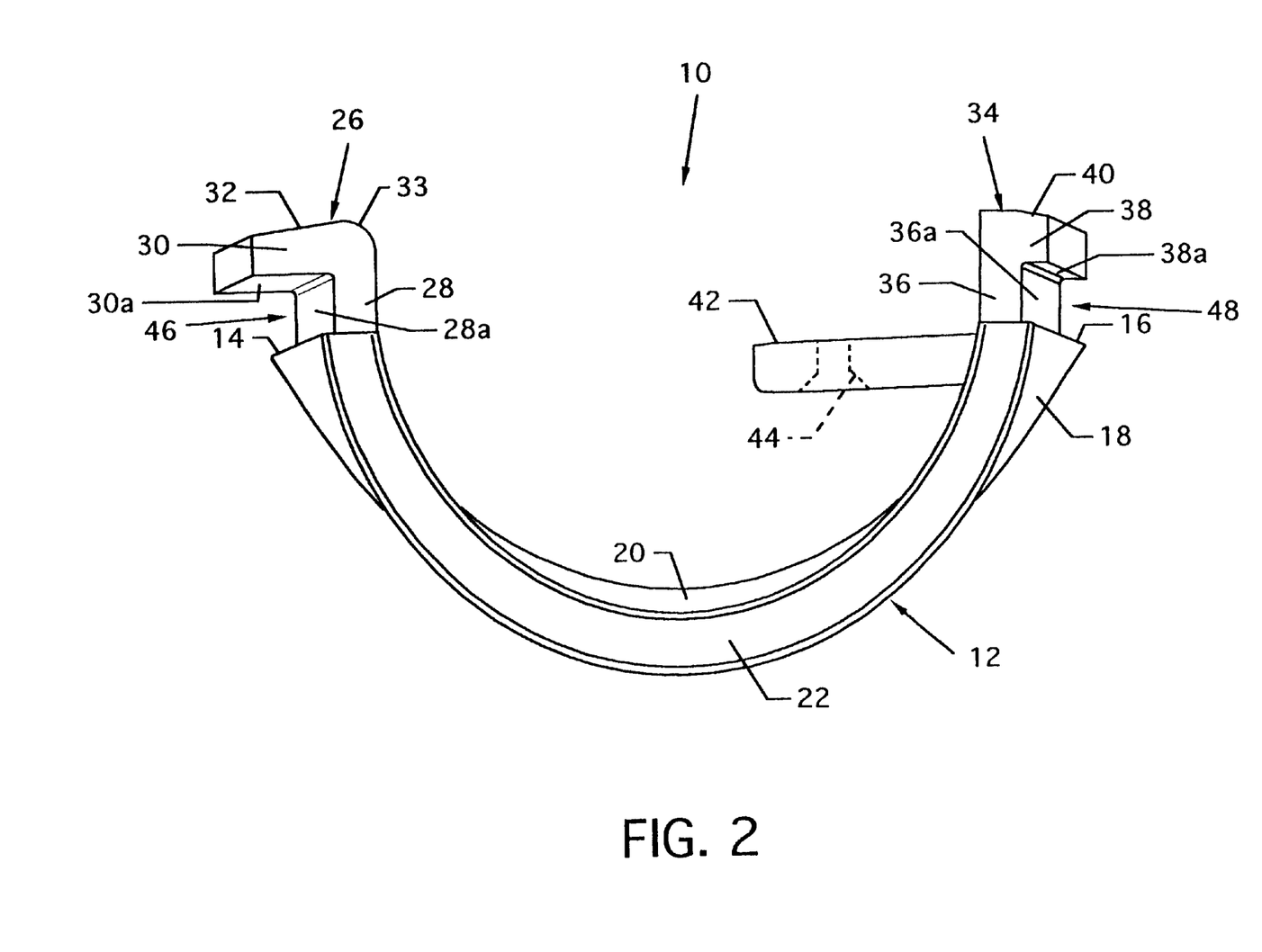
FIG. 2 illustrates an end view of the cable management system.

FIG. 2 illustrates an end view of the cable management system 10, where all numerals previously mentioned correspond to those elements previously described. Illustrated in particular is the anchoring tab 42 extending inwardly from the interior curved surface 20 of the U-shaped body 12 which is incorporated, in part, to secure the cable management system 10 to another object, as later described in detail. Also illustrated are opposing channels 46 and 48, also incorporated to secure the cable management system 10 to a host object, which are located in close proximity to the flanges 26 and 34, respectively. Channel 46, which is outwardly open, is formed by the lower surface 30a of the horizontal flange portion 30, the outer surface 28a of the vertical flange portion 28, and by the greater portion of the interrupted planar surface 14 which is in alignment with the lower surface 30a and the outer surface 28a. In a similar fashion, channel 48, which is outwardly open, is formed by the lower surface 38a of the horizontal flange portion 38, the outer surface 36a of the vertical flange portion 36, and by the greater portion of the interrupted planar surface 16 which is in alignment with the lower surface 38a and the outer surface 36a. The flange 26 is characterized by the horizontal portion 30 being of a length exceeding that of the corresponding horizontal portion 38 of flange 34 for the purpose of self-retainment of the flange 26 of the cable management system 10 during installation, as later described in detail.

Figure 3:
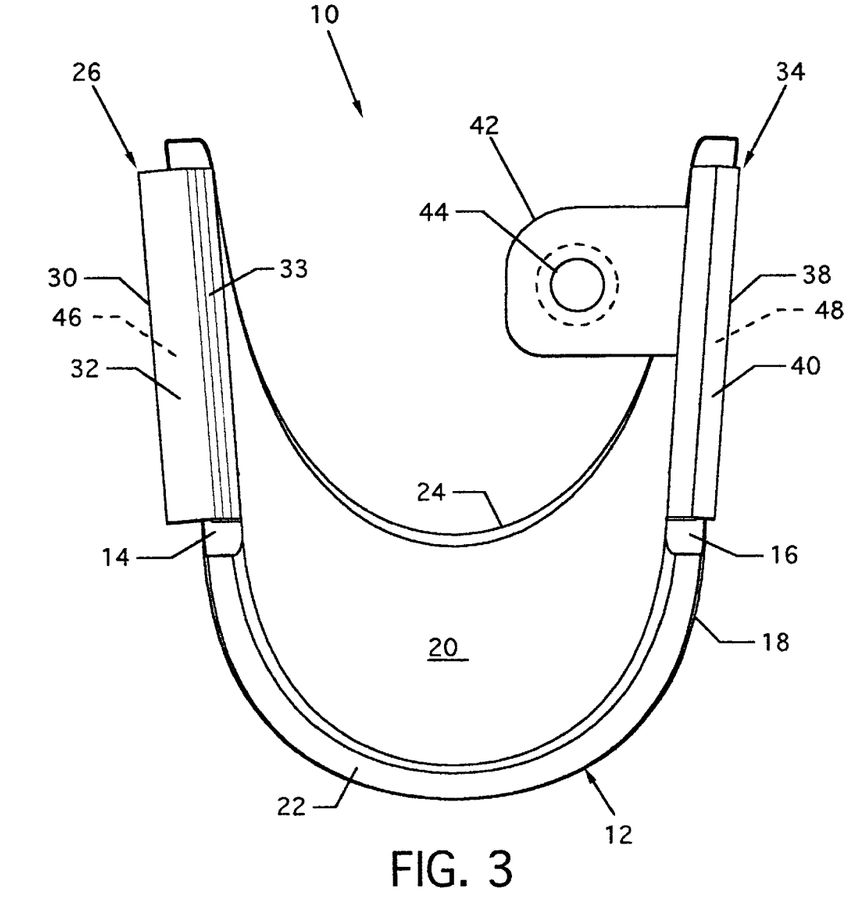
FIG. 3 illustrates a top view of the cable management system.

FIG. 3 illustrates a top view of the cable management system 10, where all numerals correspond to those elements previously described.

Figure 4:
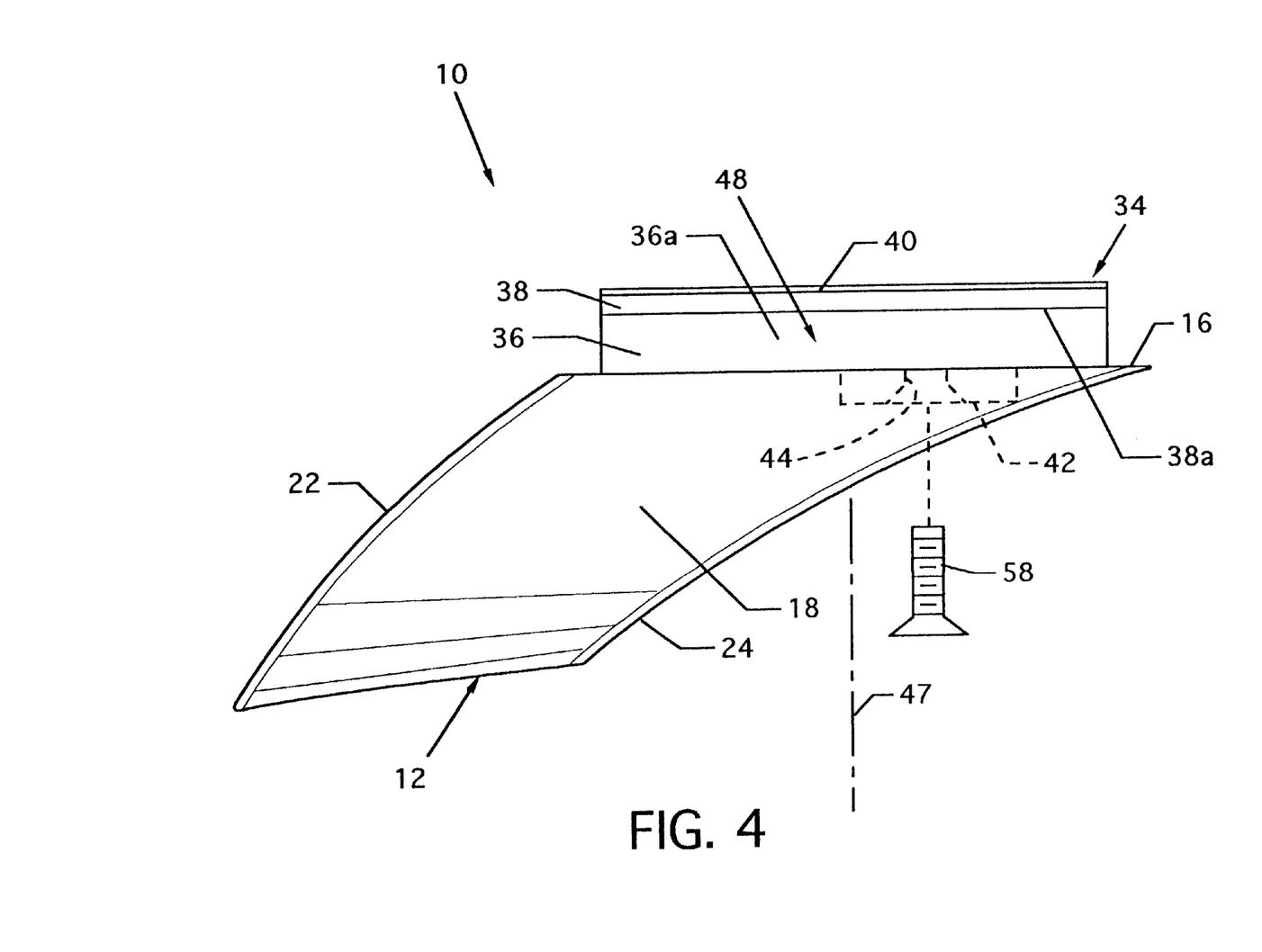
FIG. 4 illustrates a side view of the cable management system.

FIG. 4 illustrates a side view of the cable management system 10, where all numerals previously mentioned correspond to those elements previously described. Illustrated in particular in this figure and FIG. 3 is the U-shaped body 12 which is aptly designed to allow a machine screw 58, or other suitable fastener, reasonable and suitable access for insertion and rotational positioning into and through the body hole 44 in the anchoring tab 42. If, for instance, the lower region of the U-shaped body 12 were to be aligned directly with and extending directly below the flanges 34 and 26 (FIG. 3), which it is not, reasonable access of the machine screw 58 and a rotational device such as a screwdriver could be severely restricted when using the machine screw 58 as an assistive securing member. To allow access to the body hole 44 in the anchoring tab 42, the U-shaped body 12 is canted or slewed to the left of a vertical axis 47 centered between the flanges 26 and 34 (FIG. 3), thereby allowing sufficiently clear access space where the machine screw 58 can be inserted without hinderance or interference by adjoining structure and subsequently rotated by a suitable rotational device.

Figure 5:
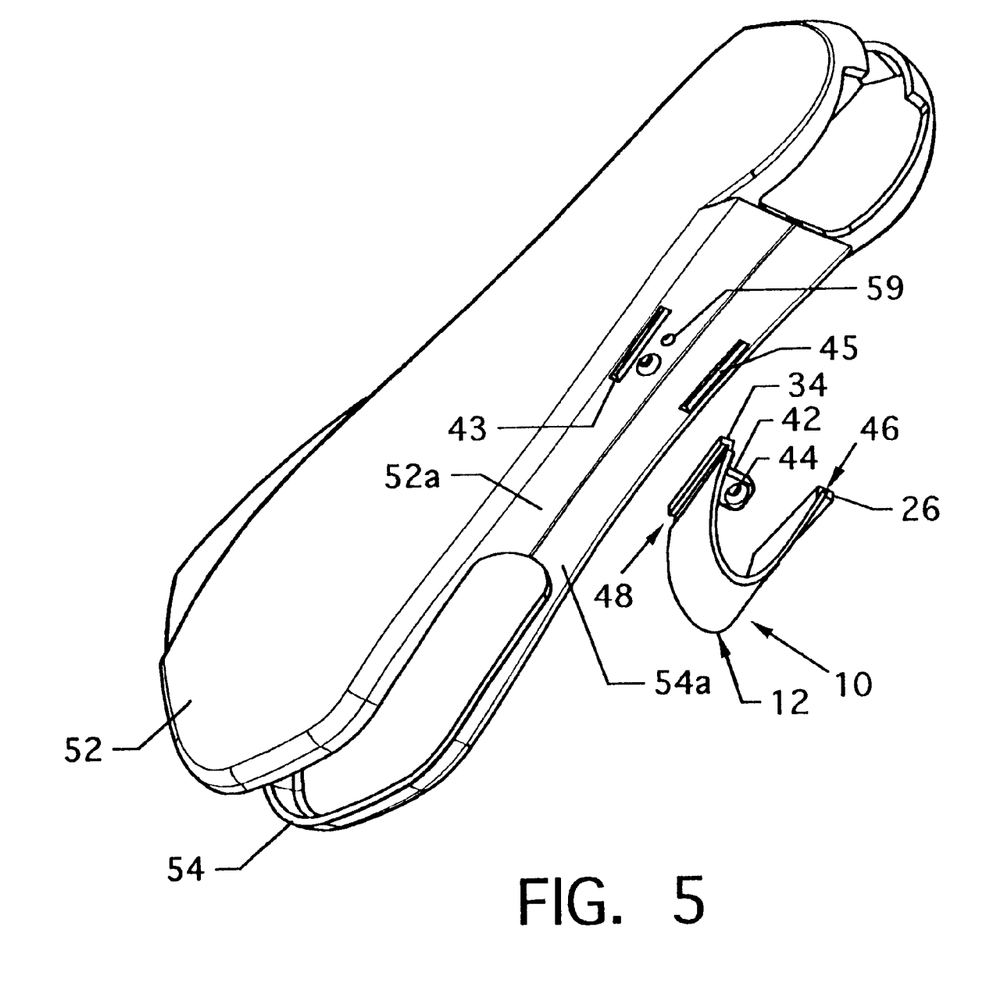
FIG. 5 illustrates a view of the cable management system prior to engagement with longitudinally oriented slots located in supportive areas of a host structure.

FIG. 5 illustrates, for example, a view of the cable management system 10 prior to engagement with longitudinally oriented slots 43 and 45 located in supportive host surfaces such as those, for example, found on the housing bottoms 52a and 54a of mated and opposing left and right complementary housings 52 and 54 surrounding a support arm 50 (FIG. 6), where all numerals previously mentioned correspond to those elements previously described. Firstly, and as later described in detail in relation to FIG. 7, flange 26 is first aligned to and then inserted into and is loosely captured in the longitudinally oriented slot 45 and, secondly, the U-shaped body 12 is rotated about the junction of the flange 26 and the longitudinally oriented slot 45 until the flange 34 is brought into close alignmental proximity with the longitudinally oriented slot 43 whereupon the upper regions of the U-shape body 12 are compressed to be aligned with and to be inserted into the longitudinally oriented slot 43. Compression across the upper regions of the U-shaped body 12 is then released, allowing the spring-like memory of the U-shaped body 12 to advance the flanges 26 and 34 outwardly to allow full capture of the channels 46 and 48, which are adjacent to the flanges 26 and 34, respectively, by elements of the slots 45 and 43.

Figure 6:
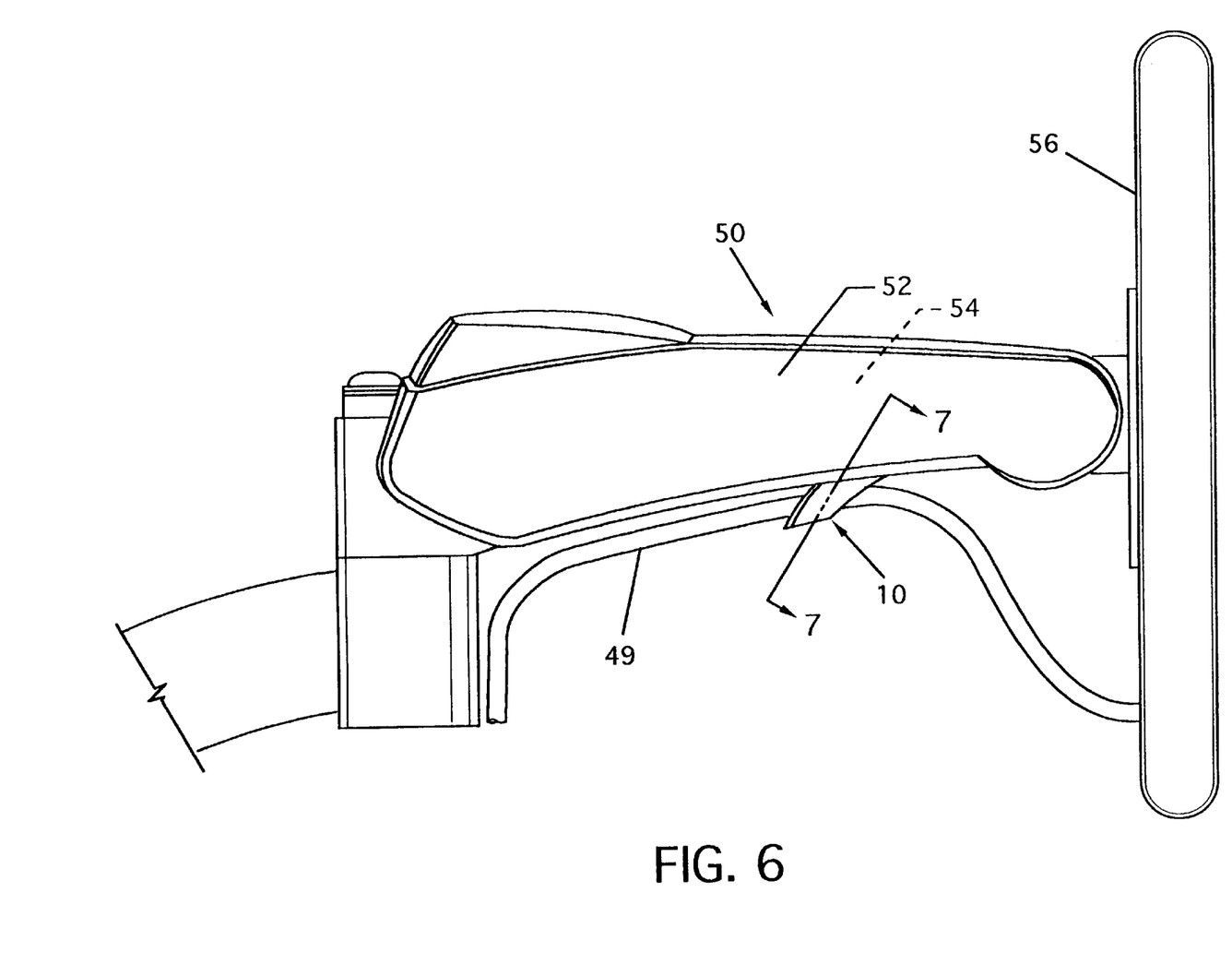
FIG. 6 illustrates the use of the cable management system to support or manage a cable in conjunction with a host support arm supporting a viewing screen; and, FIG. 7 illustrates a cross sectional view along line 7—7 of FIG. 6.
Figure 7:
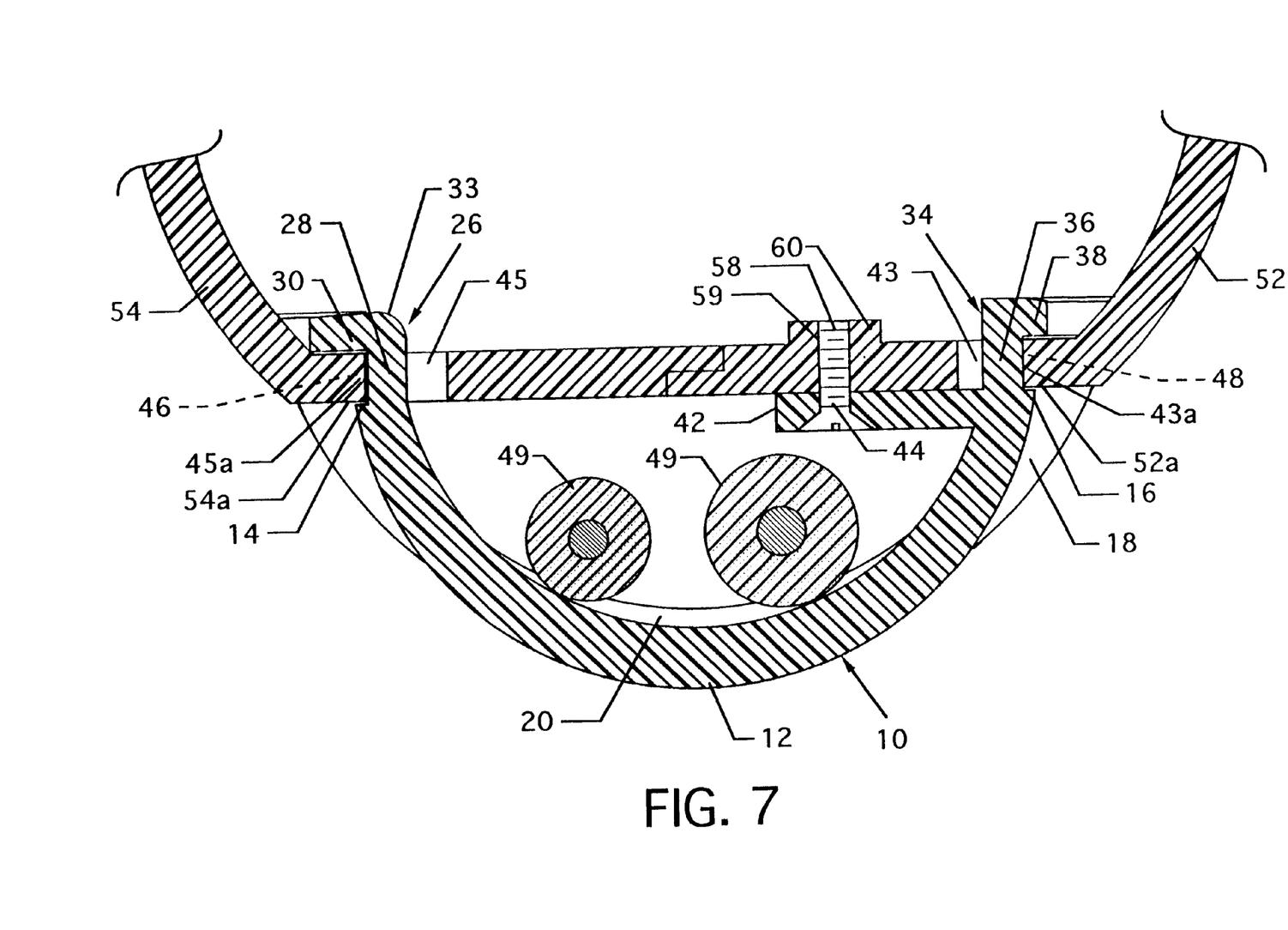

FIG. 6 illustrates the use of the cable management system 10 to support or manage a cable 49 in conjunction with a support arm 50 supporting a pivotable viewing screen 56, where all numerals previously mentioned correspond to those elements previously described. The support arm 50 includes an internal support mechanism (not illustrated) which is surrounded by a split host housing having opposing complementary left and right housings 52 and 54, respectively, as also shown in FIGS. 5 and 7. The cable management system 10 aligns to and engages slots 43 and 45 located on the host housing bottoms 52a and 54a of the left and right host housings 52 and 54 and is secured to housing 52 by a machine screw 58 or other suitable fastener as illustrated in FIG. 7. One or more cables 49 can be captured by the cable management system 10 to provide orderly cable routing along the support arm 50. Although the cable management system 10 is described as being secured to housing bottoms 52a and 54a, the cable management system 10 can be used to secure cables and the like to any other types of static and variable geometry devices and shall not be construed to be limiting to the scope of the invention.

Mode of Operstion

FIG. 7 best illustrates the mode of operation of the cable management system 10 and illustrates a cross sectional view along line 7—7 of FIG. 6, where all numerals previously mentioned correspond to those elements previously described. FIG. 7 illustrates the secure engagement of the cable management system 10 to the left and right host housings 52 and 54 to route and manage one or more cables 49. Utilization and installation of the cable management system 10 is straightforward and accomplished with a minimum of effort. The flange 26 is first cocked at an angle of approximately 45°, for purposes of example and demonstration, to the slot 45 to bypass the geometric constraints offered by the cross section of the slot 45 prior to and during insertion. The cable management system 10 is moved upwardly to initiate placement of the flange 26 within the slot 45. As the cocked horizontal portion 30 of the flange 26 begins to protrude beyond the upper region of the slot 45, the cable management system 10 is rotated to cause the channel 46 to position in the slot 45 and to engage the outwardly located side 45a of the slot 45 as well as the upper and lower surfaces of the right housing bottom 54a. The radiused surface 33 on flange 26 allows for accommodation of the flange 26 by a minimally-sized slot 45 with respect to the width of slot 45. The extra length of the horizontal portion 30 of the flange 26 urges the flange 26 and channel 46 to remain loosely engaged in the slot 45 during and subsequent to rotational positioning of the cable management system 10 when and if one or more cables are loaded to be captured between the interior curved surface 20 and the left and right housing bottoms 52a and 54a, respectively, at this time. In the alternative, cables can be loaded subsequent to rotational positioning of and fixation of the cable management system 10 to the host surface if desired. Subsequent to loading, the cable management system 10 is rotated to bring the flange 34 into close proximity with the slot 43 and then is manually compressed in a manner to force the channel 46 outwardly into full and hard engagement against the outward side 45a of the slot 45 and to simultaneously force the channel 48 inwardly towards the opposing channel 46, thereby bringing the flange 34 into alignment with the slot 43 located in the left housing bottom 52a. The cable management system 10 is then further rotated until the anchoring tab 42, which functions as a stop, aligns to the left housing bottom 52a which also aligns the channel 48 in the proper vertical position with respect to the outward side 43a of the slot 43. Manual compression across the cable management system 10 is then relaxed to allow the memory spring qualities across the U-shaped body 12 to then force the channel 48 outwardly against the outward side 43a of the slot 43 and additionally to engage the upper and lower surfaces of the left housing bottom 52a. Capture of one or more cables between the interior curved surface 20 and the left and right housing bottoms 52a and 54a, respectively, as accomplished in the preceding process, or insertion of cables subsequent to securing of the cable management system 10 to the left and right housing bottoms 52a and 54a, can be sufficient for managing and routing of a single cable or several light cables. Further securing of the cable management system 10 to the left and right housing bottoms 52a and 54a when conditions warrant, such as by the use of one or more heavy cables or just for the ensured positional security, is accomplished by inserting a machine screw 58 or other suitable fastener through the body hole 44 in the anchoring tab 42 into a hole 59 in the left bottom housing 52a which can also include a boss 60 extending vertically therefrom. The horizontal width of the horizontal portion 30 of the flange 26 in combination with the upper region of the vertical portion 28 of the flange 26 exceeds the width of the slot 45 in the right housing 54 to maintain secure positioning of the flange 26 in the slot 45 by the use of interfering geometry. Integrity of the union of the slot 45 and the flange 26 is maintained even if side or other loading is applied to distort the U-shaped body 12 by applying loads to the U-shaped body 12 which tend to urge the flange 26 inwardly toward the center of the U-shaped body 12, thereby causing alignment of the only portion of the flange 26 with the slot 45. The length of the horizontal portion 30 of the flange 26 is sufficient to partially engage the area of the right housing 54 just outward of the slot 45. Removal of the flange 26 from the slot 45 can only be accomplished by removal of the screw 44 and subsequent rotation cable management system 10 of approximately 45° to negate the effects of interference geometry to allow removal of the flange 26 from the slot 45. Sufficient clear space between the interior curved surface 20 and the left and right housing bottoms 52a and 54a is desirable to allow the captured cable(s) freedom to reposition in a longitudinal direction when host members are repositioned.

Various modifications can be made to the present invention without departing from the apparent scope hereof.

| CABLE MANAGEMENT SYSTEM PARTS LIST | |
|---|---|
| 10 | cable management system |
| 12 | U-shaped body |
| 14 | interrupted planar surface |
| 16 | interrupted planar surface |
| 18 | exterior curved surface |
| 20 | interior curved surface |
| 22 | edge surface |
| 24 | edge surface |
| 26 | flange |
| 28 | vertical portion |
| 28a | outer surface |
| 30 | horizontal portion |
| 30a | lower surface |
| 32 | angled surface |
| 33 | radiused surface |
| 34 | flange |
| 36 | vertical portion |
| 36a | outer surface |
| 38 | horizontal portion |
| 38a | lower surface |
| 40 | angled surface |
| 42 | anchoring tab |
| 43 | slot |
| 43a | outward side of slot |
| 44 | body hole |
| 45 | slot |
| 45a | outward side of slot |
| 46 | channel |
| 47 | vertical axis |
| 48 | channel |
| 49 | cable |
| 50 | support arm |
| 52 | left housing |
| 52a | left housing bottom |
| 54 | right housing |
| 54a | right housing bottom |
| 56 | viewing screen |
| 58 | machine screw |
| 59 | hole |
| 60 | boss |

What is claimed is:

1. A cable fastener comprising;
   a flexible U-shaped body including opposing curved surfaces with clip means at each end;
   a support arm including opposing slots;
   said clip means of said flexible U-shaped body engageable into said opposing slots, said body and said support arm creating a confined space for at least one repositionable cable; and
   an anchoring tab located in close proximity to a second end of the flexible U-shaped body and extending inwardly and at a substantially right angle to the end of the flexible U-shaped body.

2. A cable fastener comprising:

a flexible body with a first end and a second end;

the first end insertable into a first slot on a host structure and the second end insertable into a second slot on the host structure;

the flexible body and the host structure defining a confined space for at least one repositionable cable; and an anchoring tab located in close proximity to the second end of the flexible body.

3. The cable fastener of claim 2 wherein the flexible body is resilient.

4. The cable fastener of claim 2 wherein the first end comprises a first flange having a first vertical portion extending upwardly and a first horizontal portion extending outwardly from the first end of the flexible body and the second end comprises a second flange having a second vertical portion extending upwardly and a second horizontal portion extending outwardly from the second end of the flexible body.

5. The cable fastener of claim 4 wherein the first flange is positionable at an angle during insertion and bypasses geometric constraints of a cross section of the first slot.

6. The cable fastener of claim 4 wherein the first end further comprises a first channel, the first channel engageable with an outwardly located side of the first slot.

7. The cable fastener of claim 4 wherein the second end is mateable with the second slot in the host structure, the second horizontal portion having a lesser horizontal cross section than a cross section of the second slot.

8. The cable fastener of claim 4 wherein the second end further comprises a second channel, the second channel engageable with an outwardly located side of the second slot.

9. The cable fastener of claim 8, wherein the anchoring tab has a first hole, the first hole receivable by a fastener, and the anchoring tab extending inwardly and at a substantially right angle with respect to the second vertical portion.

10. The cable fastener of claim 4 wherein the flexible body is integral with the first flange and second flange.

11. The cable fastener of claim 2 wherein the flexible body is angularly offset oblique to a planar mating surface of the host structure.

12. The cable fastener of claim 2 wherein the first end is mateable with a first slot in the host structure, the first end having a first horizontal portion with a horizontal cross section that is greater than a cross section of the first slot.

13. The cable fastener of claim 2 wherein the flexible body is U-shaped.

14. The cable fastener of claim 2, wherein the anchoring tab has a first hole, the first hole receivable by a fastener, and the anchoring tab extending inwardly and at a substantially right angle with respect to the second vertical portion.

15. A cable fastener comprising:

a flexible body with a first end and a second end;

the first end insertable into a first slot on a host structure and the second end insertable into a second slot on the host structure;

the flexible body and the host structure defining a confined space for at least one repositionable cable; and an anchoring tab having a first hole, the first hole receivable by a fastener, the anchoring tab located in close proximity to the second end and extending inwardly and at a substantially right angle with respect to the second vertical portion.

16. A cable fastener comprising:

a flexible body with a first end and a second end;

the first end insertable into a first slot on a host structure and the second end insertable into a second slot on the host structure;

the flexible body and the host structure defining a confined space for at least one repositionable cable; and an anchoring tab having a first hole, the first hole receivable by a fastener, the anchoring tab located in close proximity to the second end and extending inwardly and at a substantially right angle with respect to the second vertical portion.

17. A cable fastener comprising:

a flexible body with a first end and a second end;

the first end insertable into a first slot on a host structure and the second end insertable into a second slot on the host structure;

the flexible body and the host structure defining a confined space for at least one repositionable cable;

an anchoring tab having a first hole. the first hole receivable by a fastener, the anchoring tab located in close proximity to the second end and extending inwardly and at a substantially right angle with respect to the second vertical portion; and wherein the first hole of the anchoring tab is alignable with a second hole in the host structure as the second channel engages the second slot.

18. A cable fastener comprising:

a U-shaped resilient angularly offset flexible body with a first end and a second end;

the first end insertable into a first slot on a host structure and the second end insertable into a second slot on the host structure;

the first end having a first flange with a first vertical portion extending upwardly and a first horizontal portion extending outwardly from the first end of the flexible body, the first horizontal portion having a greater cross section than a cross section of the first slot;

the first end having a first channel, the first channel engageable with an outwardly located side of the first slot;

the second end having a second flange with a second vertical portion extending upwardly and a second horizontal portion extending outwardly from the second end of the flexible body, the second horizontal portion having a lesser cross section than a cross section of the second slot;

the second end having a second channel, the second channel engageable with an outwardly located side of the second slot;

an anchoring tab having a first hole, the first hole receivable by a fastener, the anchoring tab located in close proximity to the second end and extending inwardly and at a substantially right angle with respect to the second vertical portion, the first hole of the anchoring tab alignable with a second hole in the host structure as the second channel engages the second slot; and, the flexible body and the host structure defining a confined space for at least one cable.

* * * * *